US007480920B2

(12) United States Patent
Brendle et al.

(10) Patent No.: US 7,480,920 B2
(45) Date of Patent: Jan. 20, 2009

(54) SYSTEMS AND METHODS FOR PROVIDING AN ENTERPRISE SERVICES DESCRIPTION LANGUAGE

(75) Inventors: Rainer Brendle, Neckargemuend (DE); Frank Brunswig, Heidelberg (DE); Bernhard Drabant, Muehlhausen (DE); Thomas Fiedler, Pfinztal (DE); Ulrike Heuer, Rauenberg (DE); Axel Schuller, Schwetzingen (DE)

(73) Assignee: SAP AG, Walldorf, DE (US)

( * ) Notice: Subject to any disclaimer, the term of this patent is extended or adjusted under 35 U.S.C. 154(b) by 178 days.

(21) Appl. No.: 11/386,651

(22) Filed: Mar. 23, 2006

(65) Prior Publication Data
US 2007/0226751 A1    Sep. 27, 2007

(51) Int. Cl.
  G06F 3/00     (2006.01)
  G06F 9/44     (2006.01)
  G06F 9/46     (2006.01)
  G06F 13/00    (2006.01)
  G06F 15/16    (2006.01)
  G06Q 10/00    (2006.01)
  G06Q 30/00    (2006.01)

(52) U.S. Cl. .............. 719/320; 719/313; 719/315; 719/330; 709/201; 705/1

(58) Field of Classification Search .............. 719/313, 719/315, 320, 330; 709/201–203; 705/1
See application file for complete search history.

(56) References Cited

U.S. PATENT DOCUMENTS

| 7,159,224 | B2* | 1/2007 | Sharma et al. .............. 719/310 |
| 7,200,657 | B2* | 4/2007 | Adams et al. ............... 709/224 |
| 7,246,358 | B2* | 7/2007 | Chinnici et al. ............. 719/315 |
| 7,296,072 | B2* | 11/2007 | Flurry et al. ................ 709/226 |
| 7,353,512 | B2* | 4/2008 | Katz et al. .................. 717/178 |
| 2002/0067370 | A1* | 6/2002 | Forney et al. ............... 345/742 |
| 2005/0132086 | A1* | 6/2005 | Flurry et al. ................ 709/238 |
| 2005/0144277 | A1* | 6/2005 | Flurry et al. ................ 709/225 |
| 2005/0160153 | A1* | 7/2005 | Knutson et al. ............. 709/217 |
| 2005/0262188 | A1* | 11/2005 | Mamou et al. .............. 709/203 |
| 2005/0262189 | A1* | 11/2005 | Mamou et al. .............. 709/203 |
| 2005/0262191 | A1* | 11/2005 | Mamou et al. .............. 709/203 |

(Continued)

OTHER PUBLICATIONS

Tsai et Al. Extending WSDL to Facilitate Web Services Testing. Proceedings of the 7th IEEE International Symposium on High Assurance Systems Engineering. 2002. pp. 1-2. Internet site: http://csdl2.computer.org/comp/proceedings/hase/2002/1769/00/17690171.pdf.*

(Continued)

Primary Examiner—Meng-Ai An
Assistant Examiner—Qing-Yuan Wu
(74) Attorney, Agent, or Firm—Mintz, Levin, Cohn, Ferris, Glovsky and Popeo P.C.

(57) ABSTRACT

Methods and apparatus, including computer program products, are provided for providing a language for defining a service. In one embodiment, there is provided a method for making a call to the service having a business object. Moreover, the method may include formatting a message based on a language, the language defining an interaction with the business object at the service and an association between the business object and a business object node, the association enabling an instantiation of the business object including the business object node; and calling the service using the formatted message, such that the formatted message instantiates the business object.

19 Claims, 5 Drawing Sheets

U.S. PATENT DOCUMENTS

2005/0262192 A1* 11/2005 Mamou et al. ............... 709/203
2005/0262193 A1* 11/2005 Mamou et al. ............... 709/203
2005/0262194 A1* 11/2005 Mamou et al. ............... 709/203
2006/0010195 A1* 1/2006 Mamou et al. ............... 709/203
2006/0069717 A1* 3/2006 Mamou et al. ............... 709/203
2007/0028247 A1* 2/2007 Rodriguez ................. 719/328
2007/0088850 A1* 4/2007 Alperin et al. ............... 709/246

OTHER PUBLICATIONS

Rajasekaran et al., "Enhancing Web Services Description and Discovery to Facilitate Composition," 2004, Springer Berlin/Heidelberg, vol. 3387/2005, pp. 55-68.*

Chen et al., "Study on Qos Driven Web Services Composition," 2006, Springer Berlin/Heidelberg, vol. 3841/2006, pp. 702-707.*

* cited by examiner

SYSTEMS AND METHODS FOR PROVIDING AN ENTERPRISE SERVICES DESCRIPTION LANGUAGE

BACKGROUND

1. Field

The present invention generally relates to data processing. More particularly, the present invention relates to providing a language for defining services.

2. Background and Material Information

Advances or changes in how enterprises conduct business result from, for example, growing competition and globalization, mergers and acquisition, or a revamping of business models. Successful advances and changes often depend on how quickly the enterprise's information technology (IT) organization adapts to evolving business needs.

For organizations to enable business advances and changes, they must ensure that enterprise applications are not only high-performance business engines driving efficiencies, but also that the applications become flexible building blocks of future business systems. Recently, building blocks have taken the form of "services." A service, such as a Web service (or program), represents a self-contained, self-describing piece of application (program) functionality that can be found and accessed by other applications. A service may be self-contained because the application using the service does not have to depend on anything other than the service itself, and may be self-describing because all the information on how to use the service can be obtained from the service itself. The descriptions may be centrally stored and accessible through standard mechanisms. Moreover, instead of requiring programmers to establish and maintain links between applications, services may be loosely coupled, making connections simpler and more flexible and allowing applications to more easily find and understand services offered by other applications.

A user may interact with a service by "calling" the service. The call may include a text message formatted in accordance with XML (eXtensible Markup Language) and WSDL (Web Services Description Language). XML is a data format for publishing and exchanging information such as a message, on the Internet or an intranet. WSDL is an XML-based format for describing a service, such as a Web service. The WSDL standard is available at www.w3.org (see, e.g., Web Services Description Language (WSDL) 1.1, W3C Note, 15 Mar. 2001, by Erik Christensen, Francisco Curbera, Greg Meredith, and Sanjiva Weerawarana). WSDL enables definitions that describe how to access a Web service and what operations the Web service will perform. However, WSDL provides a very basic mechanism for defining a Web service. As such, there is a need to enhance WSDL.

SUMMARY

The present invention provides methods and apparatus, including computer program products, for providing a language for defining services.

In one exemplary embodiment, there is provided a method for making a call to a service having a business object. Moreover, the method may include formatting a message based on a language, the language defining an interaction with the business object at the service including an association between the business object and a business object node, the association enabling an instantiation of the business object including the business object node; and calling the service using the formatted message, such that the formatted message instantiates the business object.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of implementations consistent with the present invention and, together with the description, help explain some of the principles associated with the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1A:
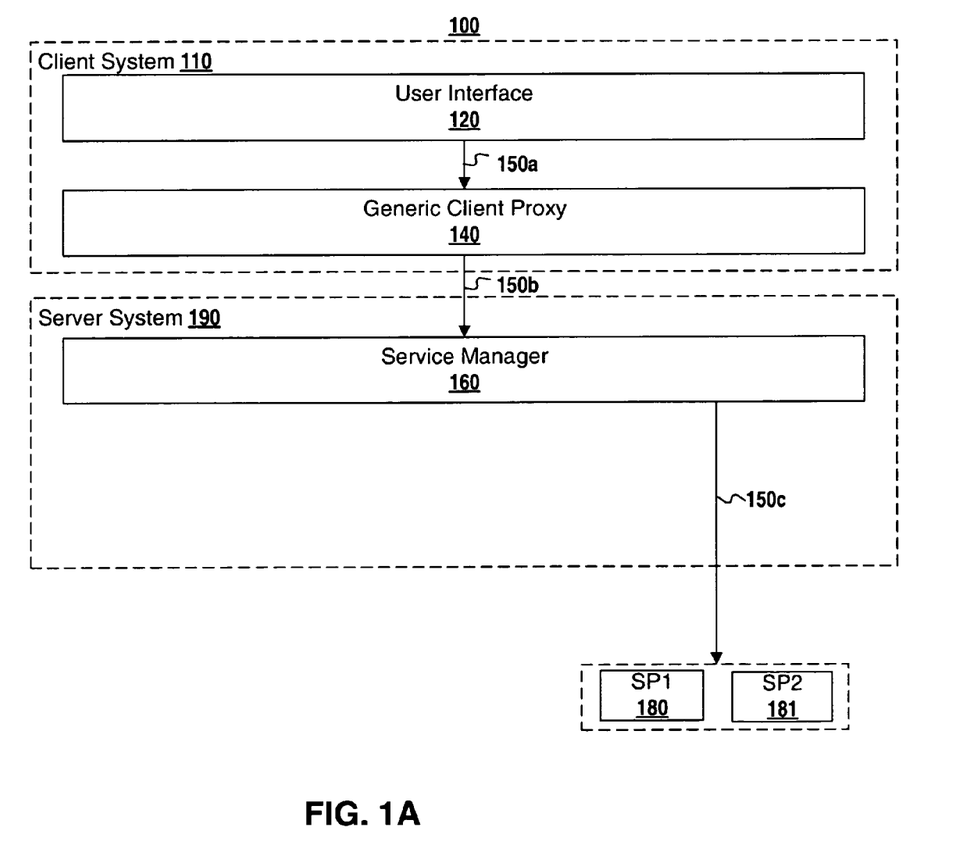
FIG. 1A illustrates a block diagram of an exemplary system environment consistent with certain aspects related to the present invention.

FIG. 1A is a block diagram of an exemplary system 100 environment that includes a client system 110 and a server system 190 for calling a service at a service provider, such as service providers 180 and 182. An example of a service provided by service provider 180 is an application, such as a Web service. Although a Web service may be made available through the Internet, a Web service may also be made available through an intranet or any other network.

The service provider 180 serves as an endpoint which can be called with a request generated in accordance with a language that describes and defines the service. An example of a language used to describe and define a service is a Web Service Description Language (WSDL). In one embodiment, an extension may be provided to WSDL to allow the description of services having objects, such as business objects. An "object" means a bundle of variables (e.g., data) and related methods accessed by software. In object-oriented programming, an object is a concrete realization (instance) of a class that consists of data and the operations associated with that data. The phrase "business object" refers to a bundle of variables and related methods that can be used for describing a business process or task. The business object may be used to describe a complete business task. Examples of business objects include a business object for providing a sales order form, which allows user interface 120 to process (e.g., view, fill-out, and the like) the form; a business object for providing a purchase order form; and any other object that corresponds to a business task.

An Enterprise Services Description Language (ESDL) is an example of a language that extends WSDL. In one embodiment, ESDL allows the description of services having business objects. The service provider 180, when called, may instantiate one or more business objects. The term "instantiate" means, in an object-oriented programming environment, deploying, customizing, running, and/or executing an application on an object of a particular class. The service provider and corresponding business objects may be called using a message formatted based on ESDL. The call including the ESDL formatted message, may define the interaction between a client 110 and a called service provider 180 and corresponding business objects. The defined interaction may thus provide the definition of the formats and/or protocols needed to interact with a service provider and a business object instantiated at the service provider. As such, an entity, such as client 110 or user interface 120, can make a call to service provider 180 using, for example, a SOAP (Simple Object Access Protocol) request message formatted in accordance with ESDL. Moreover, the ESDL formatted message may be used to completely define the interaction with the service including the instantiated business object, associated business object nodes, and the properties of the business object (and nodes). For example, by using ESDL to define the associations between the business object and business object nodes, the business object may be completely defined and instantiated by an ESDL message. By enabling a complete definition of the interaction with the service, multiple separate calls to the service to access portions of the service may be eliminated.

Although ESDL is described as an extension of WSDL, ESDL, as described herein, may be implemented as part of any other appropriate language or mechanism for calling an application, such as a service.

Figure 1B:
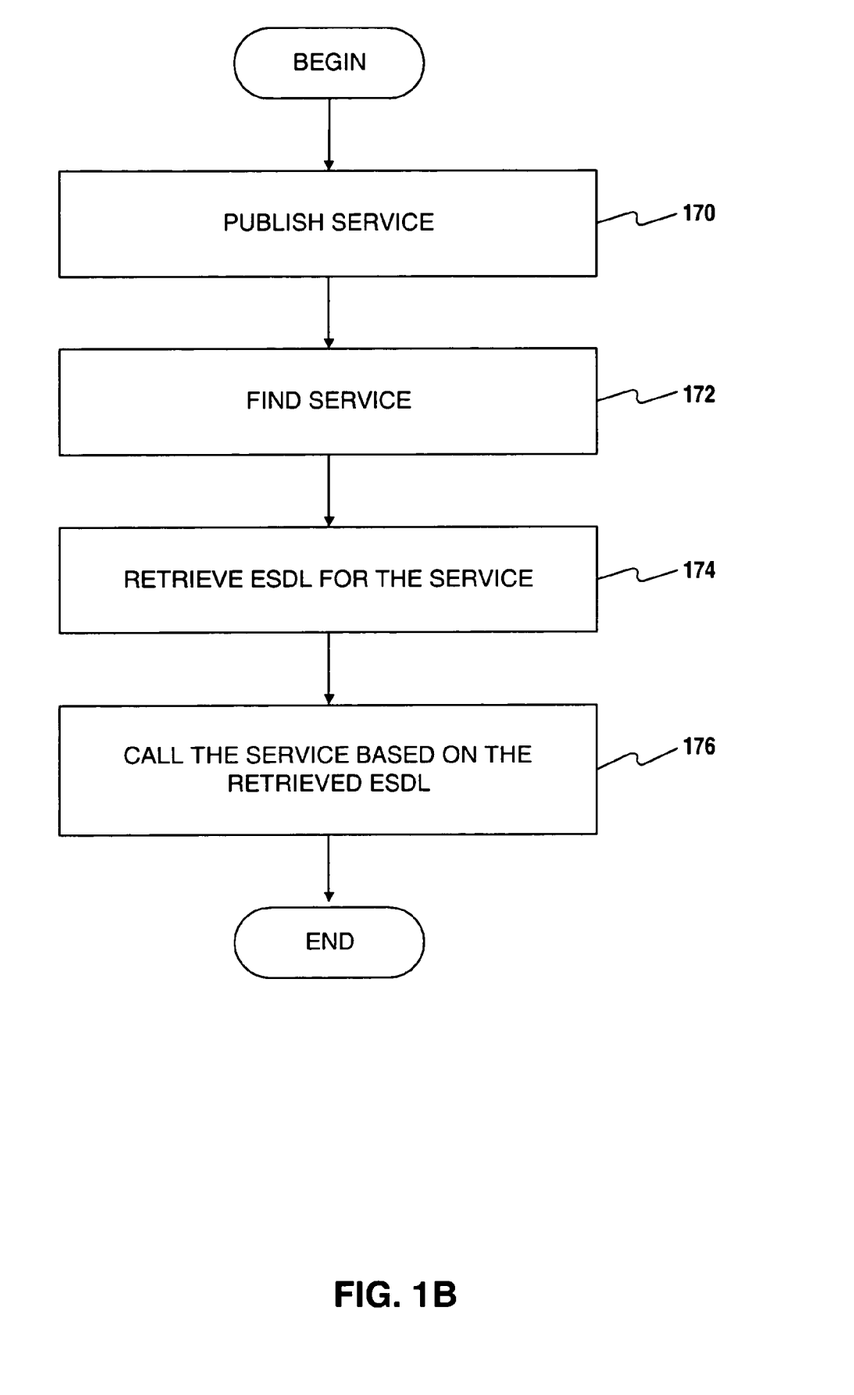
FIG. 1B depicts a flowchart with steps for calling a service consistent with certain aspects related to the present invention.

FIG. 1B depicts a flow chart with steps for using ESDL to call a service, such as a Web service. Referring to FIGS. 1A and 1B, service provider 180 may register any services available at service provider 180. The registration may include publishing the location of the service (step 170). The location of the service may be published at an accessible registry, such as a universal description, discovery, and integration (UDDI) registry. The registry may identify the location of the service at service provider 180 and may include a description (also referred to as a definition) of the service. For example, the definitions may be in a document formatted in accordance with ESDL. Moreover, the registry may include such information for a plurality of services. Before client system 110 makes a call to a service at service provider 180, client system 110 may find the service by querying the registry for the service (step 172). For example, client 110 may query the registry for the name of the service. The registry then provides the location of the service and the location of the ESDL document defining the format and procedure for interacting with the service at service provider 180. Client system 110 then retrieves the ESDL document from the location identified by the registry (step 174). Client system 110 may then call the service at service provider 180 (step 176). The call may include a Simple Object Access Protocol (SOAP) message. Furthermore, the SOAP message may make a request to the service at service provider 180, with the request being made consistent with the descriptions provided by the ESDL document. For example, if the ESDL document defines a "name" for calling a service or a business object at the service, then client 110 would include the defined "name" in the message calling the service or the business object. Moreover, if the ESDL document defines other aspects of the service or business object, such as properties, then client 110 would also include those defined aspects in the message calling the service or the business object. As such, the client 110 may call the service having one or more business objects using a mechanism defined by the ESDL document for the service or business objects. The ESDL document also enables the call to completely define the interaction with the business object (and nodes) at the service.

Referring again to FIG. 1A, client system 110 includes a user interface (UI) 120 and a generic client proxy (GCP) 140. Client system 110 connects to server system 190 through network connection 150b. Server system 190 further includes a service manager (SM) 160 which may couple server 190 to service providers 180-181. System 100 may be implemented as part of an enterprise services framework (ESF). An enterprise services framework is a type of computer framework, such as a client-server architectural framework, that includes one or more services. The services are accessible to other parts of the ESF, such as client systems and their corresponding users, through a communication mechanism such as the Internet or an intranet. The ESF may be constructed using tools provided by SAP Netweaver™ (commercially available from SAP AG, Walldorf, Germany). Although FIG. 1A shows a single client system 110 and a single server system 190, a plurality of client systems and server systems may be used. Moreover, the components depicted in FIG. 1A may be distributed among multiple locations. Although FIG. 1A is described with respect to a client-server architecture and an ESF, system 100 can also use any other architecture or framework.

Client system 110 may include one or more processors, such as computers, to interface with server system 190. User interface 120 may provide an interface to allow a user to interact with other applications, such as service providers 180-181 and their corresponding business objects. User interface 120 may include a browser to provide content from service providers 180-182. In some implementations, SAP Web Dynpro (commercially available from SAP AG, Walldorf, Germany) is used as a model-based development environment for generating user interface 120, although other development environments can also be used. User interface 120 may call the API of generic client proxy 140 through network connection 150a to, for example, interact with one of the service providers 180-181.

Generic client proxy 140 may have an API implemented at client 110 that is accessible to user interface 120. When instantiated, generic client proxy 140 may provide an interface, such as a Remote Procedure Call (RPC) or SOAP interface, to service manager 160 at server system 190 through network connection 150b. Generic client proxy 140 may be implemented to control the functionality available to user interface 120 by providing a well-defined interface to service manager 160. For example, service manager 160 may include a variety of procedures, but generic client proxy 140 may be allowed access only to a subset of those procedures. Moreover, generic client proxy 140 may buffer requests and/or responses between user interface 120 and service manager 160.

Network connections 150a-150c may include, alone or in any combination, a telephony-based network, a local area network (LAN), a wide area network (WAN), a dedicated intranet, wireless LAN, the Internet, an intranet, a wireless network, a bus, or any other communication mechanisms. Further, any suitable combination of wired and/or wireless components and systems may provide network connections 150a-150c. Moreover, network connections 150a-150c may be embodied using bi-directional, unidirectional, or dedicated communication links. Network connections 150a-150c may also implement standard transmission protocols, such as Transmission Control Protocol/Internet Protocol (TCP/IP), Hyper Text Transfer Protocol (HTTP), SOAP, RPC, or other protocols.

Server system 190 may include one or more processors, such as computers, to interface with other computers, such as client system 190. Generic client proxy 140 calls the API of service manager 160 at server 190. When the API of service manager 160 is called, an instance of the service manager 160 is created at server system 190. Although service manager is depicted within server 190, service manager 160 can be located anywhere and distributed among multiple locations.

Moreover, when the API of service manager 160 is called, service manager 160 may call an API to instantiate one or more of the service providers 180-181. The service manager may make a call to an API at a service provider, such as service provider 180. Moreover, the call may be in the form of a SOAP request message formatted according to ESDL. The call thus implements a SOAP request message having XML with definitions and procedures generated in accordance with the definitions provided by ESDL. For example, a user of user interface 120 may access service provider 180 to interact with a sales order stored in a database.

The data and methods associated with interacting with the sales order correspond to a business object. A business object may be associated with business object nodes as well as other objects, such as other business objects. A business object node refers to a portion of the business object. Returning to the sales order example, a business object node may refer to a portion of the sales order, such as sales order items, detailed descriptions of the sales order items, or a schedule line (e.g., pricing for the items). The business object and nodes may be stored in, for example, a database.

Figure 2:
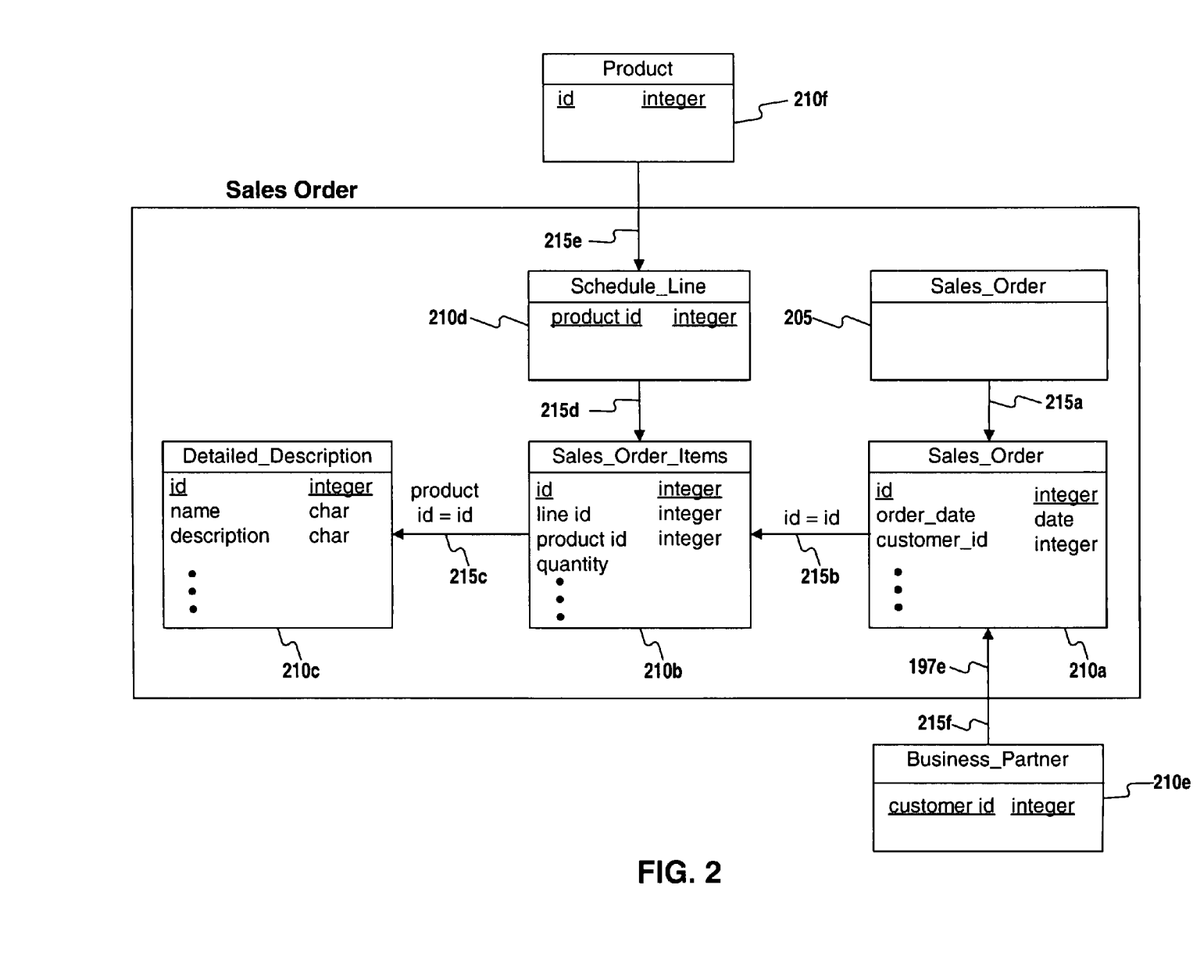
FIG. 2 illustrates a schema of objects consistent with certain aspects related to the present invention.

FIG. 2 depicts an example of a business object. A business object 205 may include one or more business object nodes, such as node 210. One of the business object nodes may be referred to as a root node to other business object nodes. To illustrate, FIG. 2 depicts a sales order business object 205 with business object nodes 210a-d. Business object node 210a serves as the root node. By way of example, a sales order business object may allow user interface 120 to process (e.g., view, fill-out, and the like) with sales order business object 205 and its nodes 210a-d stored at service provider 180. The business object nodes may be configured in a hierarchy defined by associations 215 among business object nodes. For example, the sales order business object 205 may have association 215a to business object node 210a. The association 215a may be an identifier (also referred to as an ID or a technical ID). For example, association 215a may be a sales order ID, which can be used as a key to link sales order business object 205 to sales order business object node 210a. FIG. 2 also depicts associations 215b-f that associate business object nodes 210a-e.

Business object node sales order 210a includes data, such as data fields representative of order date, sales order number, sales order header information, customer identification, and the like. The sales order 210a is associated 215b with sales order items 210b, which provides data indicative of the sales order items of sales order business object node 210a. The association 215b may be a technical ID, which serves as an identifier to link 210a and 210b. Sales order items 210b is associated 215c with the detailed description business object node 210c. Detailed description 210c may include a detailed description of the items included within sales order items 210b. The sales order items business object node 210b is also associated 215d with a schedule line business object node 210d. The schedule line 210d includes the "schedule" or price for the items available to a customer. The sales order business object 205 may have inter-business object associations, such as 210e-f. The business partner business object 210e is associated 215f with sales order business object node 210a, and the product business object node 210f is associated 215e with the schedule 210d. Although business object 205 is described with a sales order example, other types of objects and business objects may be used.

ESDL allows user interface 120 to make a call, such as a SOAP request message, to service provider 180, such that the call includes a text-based request (e.g., XML-based). The format and procedures for defining the interaction with the service provider 180 and the corresponding sales order business object are made consistent with ESDL. ESDL defines how to interact with the sales order business object at service provider 180. For example, the ESDL for the sales order business object may define the name of the business object (e.g., sales order) and input parameters (e.g., sales order identification number). To call service provider 180, user interface 120 can send a message formatted consistently with the published ESDL document for service provider 180 and the corresponding sales order business object at service provider 180. Moreover, any response from service provider 180 to user interface 120 may also be formatted consistently with the ESDL document.

ESDL may include text formatted in a text-based language, such as XML. The eXtensible Markup Language (XML) allows data and services at a service provider to be encoded as text, which has meaningful structure and semantics that both computers and humans can understand. XML allows the creation of tags that describe data, which is an example of metadata. Returning to the sales order business object example, an XML tag may be defined as "<esi: definitions" to indicate that the data corresponding to the tag provides an ESDL definition. When XML is used, the data and corresponding metadata enables the transmission and interpretation of the data between computers (and their corresponding applications). Metadata may also provide a schema. A schema is an organization or structure, such as the organization of a database or the structure of an object in an object oriented program. In object oriented programming, modeling (i.e., the analysis of objects that are used in a business or other context and the identification of the relationships among these data objects) leads to a schema, which can be stored in repository as a schema. The schema can be depicted visually as a structure or a formal text-oriented description (e.g., script). For example, metadata may be in the form of database tables. The metadata may include information such as the number of nodes in a business object, the name(s) of the nodes, the position of a node in the business object hierarchy, the structure of a node, associations, actions, and default queries on a node. The schema and corresponding metadata may thus serve as a model of the business object.

Figure 3A:
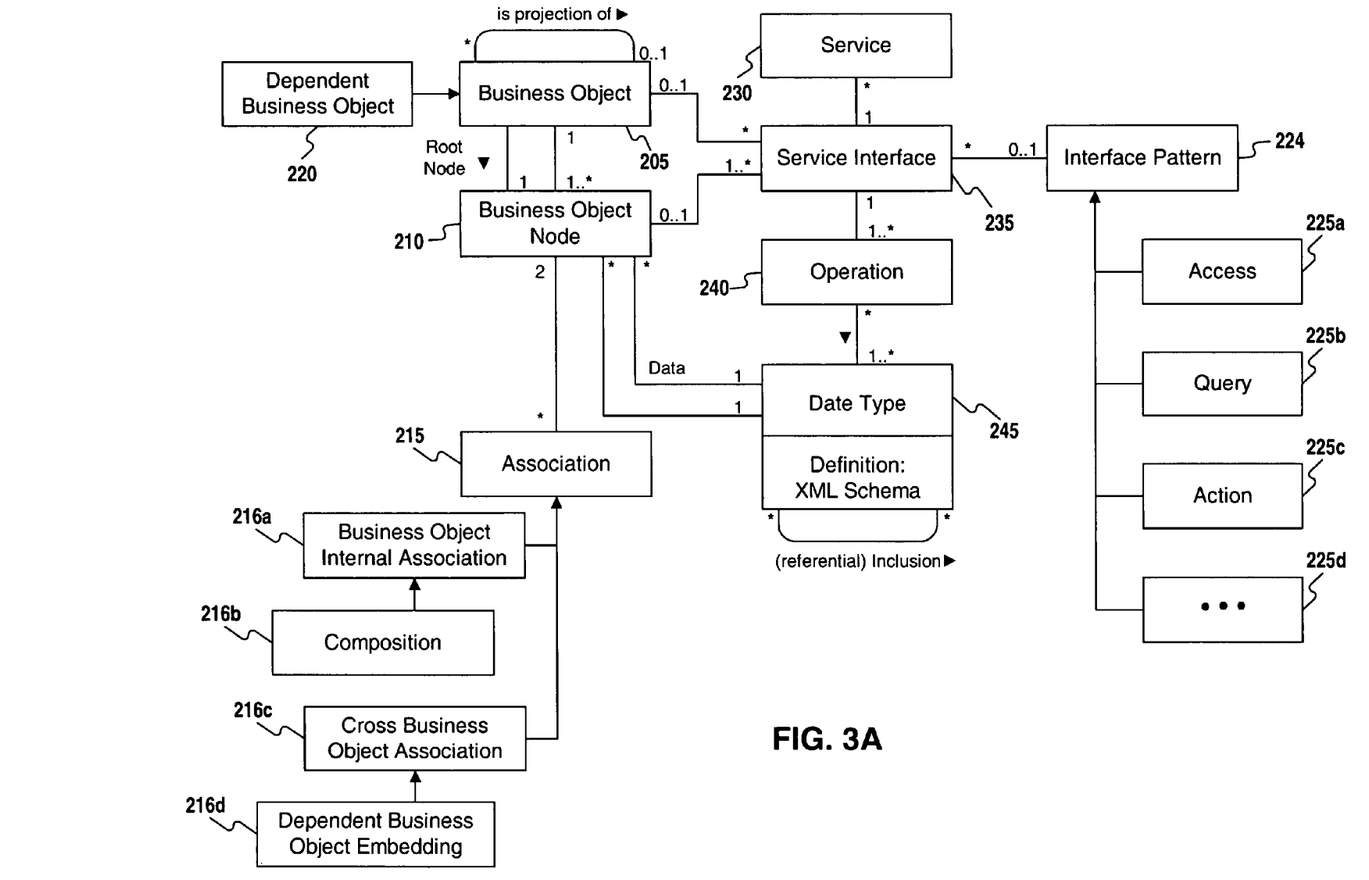
FIG. 3A depicts a block diagram of a business object model within a service defined by an Enterprise Services Description Language (ESDL) consistent with certain aspects related to the present invention.

FIG. 3A depicts a class diagram (e.g., a UML (Unified Modeling Language) class diagram or Booch class diagram) of a model of a business object accessible through a service. The model of FIG. 3A serves as a schema describing a business object and how to interact with the business object using ESDL. For example, ESDL may be used to call a service 230 at service provider 180. The call may include a SOAP request message formatted based on definitions of data and methods (also referred to as procedures) for making a call to service 230 and its corresponding business object 205 and/or business object node(s) 210. Moreover, the formatted SOAP message may define the interact with service 230, business object 205, and/or business object node(s) 210.

A business object node 210 may include an association 215 to other business objects or business object nodes. An association may also be an "internal" association 216a that links two business object nodes that are internal to the business object. For example, associations may be internal to business object 205 (see, e.g., FIG. 2 at 215a-d). Associations may also allow the composition of a composite business object from one or more business objects ("composition" type association). For example, a catalog business object may be formed as a composite 216b business object by associating different business objects, such as a purchasing business object for purchasing an item using a credit card, a sales order business object, and a display business object for controlling the display of the items in the catalog. An association may also be a "cross" business object association 216c (also referred to as inter-business object association). For example, a product business object (see, e.g., FIG. 2 at 210f) may include products included on a schedule business object node (see, e.g., FIG. 2 at 210d), both of which are associated by cross association (see, e.g., FIG. 2 at 215e). Associations may also indicate that a business object (or node) depends 216d from another business object (or node). For example, if an item is deleted from a product business object (see, e.g., FIG. 2 at 210f), the schedule business object node (see, e.g., FIG. 2 at 210d) should be updated to remove the price of the deleted product. As such, the schedule (see, e.g., FIG. 2 at 210d) depends from the product.

An association may also be used to associate a technical ID used in a business object node to one or more text descriptions ("ID-Text-Mapping" association). Referring to the example of FIG. 2, an item in sales order items 210b may have a product identification (ID) of 4711. The ID of 4711 may have associated product descriptions in different languages, such as "screw" in English, "schraube" in German, and "tornillo" in Spanish, and so forth, with the association from 4711 to the appropriate language text being determined and displayed at runtime.

Referring again to FIG. 3A, ESDL may provide definitions of associations, such as associations 215 and 216. Moreover, ESDL may allow client 110 to call a service at service provider 180 using a message. The message may define, based on the ESDL, associations 215 and 216 of business objects or business object nodes instantiated at service provider 180.

As noted above, an object, such as a business object may include data and associated methods. Examples of methods that may be included within a business object are a query 225b, an access 225a, an action 225c, as well as any other operations 225d that may be appropriate for a business object or node. In one embodiment, the operations 225a-d may be predefined using an interface pattern 224. The interface pattern 224 serves as a template defining the call format of the operation including any input parameters for the call and/or any output parameters from the call. The interface patterns 224 thus serve as a template defining each of the operations 225a-d.

FIG. 3A depicts a query 225b for returning a list of business object node identifiers (IDs) given a search criteria or a sorting option. Alternatively, query 225a may return data from a business object node based on given search criteria and sorting option. For example, if a business object is a sales order, query 225b may allow a sales order ID number search of a database containing sales orders. Action 225c may be an operation which influences and depends on the status of a business object. For example, a cancel operation is an example of an action operation. When the cancel operation is selected, software corresponding to the cancel operation cancels a pending request. Another example of an action operation is clustering operations associated with a sales order, such as accept, cancel, finish, and reject. An access operation 225a allows access to a business object instance, such access may include create, retrieve, update, and delete data. Like a business object, the operations 225a-d may also be called, based on ESDL, by a business object, business object node, or directly from a user interface 120 (or client 110). As such, ESDL may provide definitions for operations 225 and template 224. Moreover, the call, such as a SOAP request message, may define an operation 225 or a template 224 of a business object or business object node instantiated at service provider 180.

Service 230 includes a name by which the service may be called. The name of service 230 may be defined consistently with an ESDL document for service 230. The name allows a call to be made to service 230. For example, if service 230 is named "sales order," service 230 may be called using a SOAP message addressed to the "sales order" service. The sales order service 230 may allow a user at user interface 120 to process (e.g., view, fill-out, and the like) a sales order form stored at a database.

When service 230 is called by service manager 160, service 230 instantiates one or more business objects and/or business object nodes. Service interface 235 represents an API interface of service 230. Service interface 235 may also call operations 225a-d using a SOAP message formatted consistent with ESDL. Moreover, service interface 235 allows access to business objects and business object nodes when requests for those business objects are made using a SOAP request message formatted as defined by the ESDL document for service 230. Any corresponding responses from operations 225a-d, business object 205, and business object nodes 210 may also be made using a SOAP message formatted as defined by the ESDL document for service 230. Although calls from user interface 120 to service provider 180 may be made through generic client proxy 140 and/or service manager 160, user interface 120 may bypass generic client proxy 140 and/or service manager 160 when calling a service provider.

Service 230 may also include operations 240. Operations 240 define one or more operations for the call (e.g., a SOAP request message) to service 230. Examples of operations 240 include a name of a business object that will accept the call for processing, a name of a message queue for handling the call, and operations 225a-d.

Service 230 may also include data types 245. Data types 245 may be in the form of XML and are used to call service 245. Examples of data types 245 include boolean, float, int (e.g., integer), string, date, namespace, name, and the like. Service 230 may also include WSDL-based definitions, such as a port, a port type, a binding, and the like.

Figure 3B:
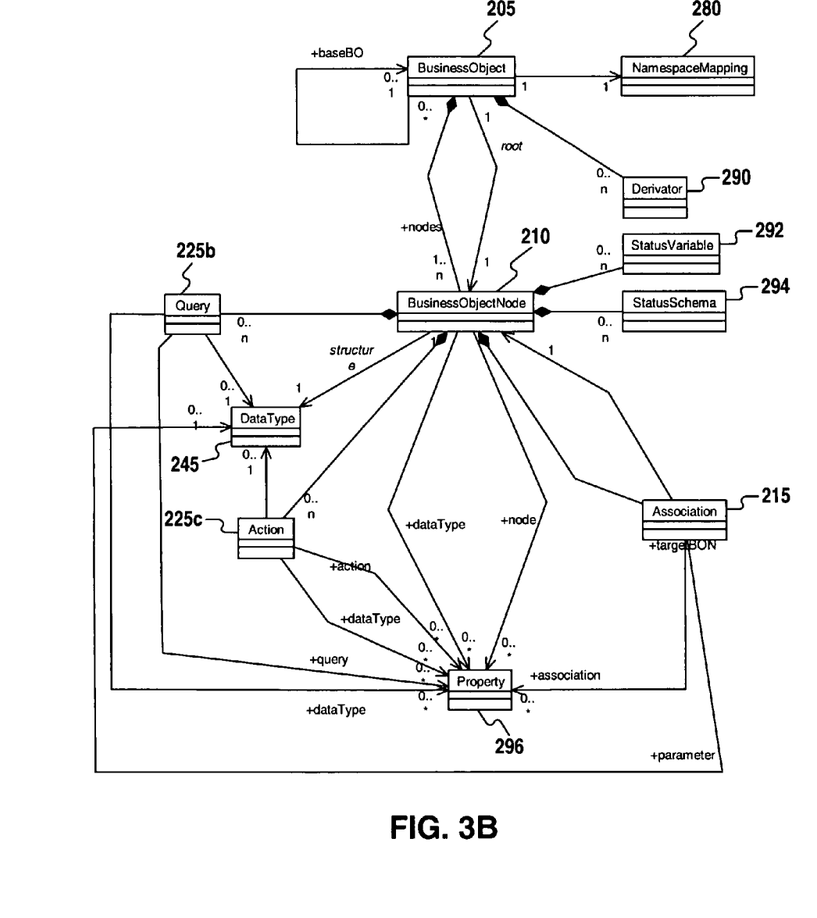
FIG. 3B illustrates another business object model defined by ESDL consistent with certain aspects related to the present invention.

FIG. 3B depicts another class diagram of a model of a business object callable using for example a SOAP message formatted in accordance with ESDL. The model of FIG. 3B also serves as a schema describing a business object and how to interact with the business object using ESDL. In addition to the elements depicted in FIG. 3A, FIG. 3B includes the following additional elements: a namespace mapping 280, a derivator 290, a status variable 292, a status schema 294, and a property 296. As such, ESDL may provide definitions for these additional elements 280-296. Moreover, ESDL may allow client 110 to call a service at service provider 180 using a message, with the message providing definitions for namespace mapping 280, a derivator 290, a status variable 292, a status schema 294, and a property 296 at service provider 180 and its corresponding business objects or business object nodes.

ESDL may include XML tags. The XML tags serve as metadata enabling the definition of the message (or call) to a service, such as service 230. The mappings from XML tags to formal descriptions of the service being called is stored in an ESDL document accessible at a location identified by the parameter associated with namespace mapping 280. For example, namespace mapping 280 may be defined in ESDL as the location www.sap.com/esdl, although other locations may be used. Although XML is described, other markup languages, such as HTML (HyperText Markup Language) and WML (Wireless Markup Language) may be used.

The service 230, corresponding business objects, and business object nodes may have one or more properties 296. For example, the elements of the FIG. 3A and FIG. 3B model (e.g., business objects, business object nodes, and associations) may have one or more of the following properties (also referred to as attributes): enabled for indicating that the element is enabled (e.g., enable with a flag or value of "true"); read only for indicating that the element is read only; mandatory for indicating the element must have a value (e.g., if a user fails to provide a credit card number for a purchase, the mandatory property would indicate that the credit card number field must be provided); default value for defining a default value for an element; user interface (UI) text for providing default text for a user interface element (e.g., default text displayed when a user enters a value in a field of a sales order); create enabled for allowing the creation of elements; update enabled for allowing the creation of elements; delete enabled for allowing deletion of elements; value set for setting a value of an element; dynamic value set for indicating that the value of an element is dynamic; and transient key for defining whether a key is persistent (e.g., stored for another session) or transient (e.g., associated with a single session).

Moreover, a field of a business object node may have a property 296 of final for indicating that a property cannot be changed by a projection. A projection is a business object or business object node that is created from a template. A template (e.g., the schema of FIG. 3) may be used to create other business objects. The final property prevents the other objects that are created (i.e., the projections) from changing any fields in the original template.

Any of the elements of the model depicted in FIG. 3A or 3B, such as the business objects, business object nodes, associations, parameters of an association, operations, input and/or output parameters of operations, and status variables, may have one or more properties. For example, a single business object node may include a plurality of properties 296, such as enabled, read only, UI text, create enabled, update enabled, and delete enabled. ESDL may thus provide definitions of properties 296 at a service having business objects. Moreover, ESDL may allow client 110 to send a message calling a service having business objects at service provider 180. The message may define one or more properties 296 of business objects or business object nodes instantiated at service provider 180. Moreover, all of the properties may be defined using ESDL or, alternatively, a property may be described in ESDL only when the property differs from a default value. For example, a service having a business object may be called and a property of the business object may be changed from a default value using a message formatted in accordance with ESDL.

Business object 205 may also include a derivator 290, a status variable 292, and a status schema 294. The status variable references a field of a business object node as a status variable 294. The field may be enumerated with at least two values. For example, the variable 'hasStateGuard' indicates whether a status variable has a "state guard" (i.e., a protected state) or not. The status schema 294 describes the relations between variables associated with an action or a status. The derivator 290 is used to model the relationship between status and action schemas located at different business object nodes. For example, when instantiated, a purchase order business object may indicate an initial status, such as "not approved." An action (e.g., "start approval") may then begin approval operations. In this example, the status of the purchase order may be "approved," "rejected," or any other status. The derivator 290 provides status information to the status 290 or action 225.

ESDL serves as a schema for defining a service, such as a Web service, and publishing that schema so that other entities can call the service. ESDL allows the service to publish the schema for interacting with business objects instantiated at the service, such as service 230 at service provider 180. ESDL provides a definition (or description) to allow client 110 to interact with the service having a business object. Moreover, the published ESDL document for the service may define, for example, business object, nodes, associations, and properties associated with the business object. As such, client 110 may instantiate the business object at a service including any corresponding business object nodes, associations, or properties associated with the business object. Referring again to FIG. 3, client 110 may call sales order business object 205 using a message formatted based on ESDL for the business object 205. Moreover, the call may be in the form of a SOAP request message having parameters defining sales order 205 including any associations 215, nodes 210, properties 296, and operations 225.

As noted, ESDL provides a mechanism for defining objects, such as business objects, at a service provider. For example, ESDL may be used to create a document identifying the services provided by service provider 180 and one or more corresponding business objects instantiated at service provider 180. The ESDL document also defining the format that a computer (e.g., client 110) calling a service at service provider 180 must follow when requesting an interaction with the business object. The ESDL document acts like a "contract" between client 110 and service provider 180 since the ESDL document defines the requirements for the call between client 110 and service provider 180. Specifically, service provider 180 provides a service only when client 110 sends a properly formatted request, such as a SOAP request message formatted in accordance with the ESDL document for the service.

For example, an ESDL document may be used to define a service named "sales order." When called, service provider 180 instantiates sales order business object 205 and other business objects and nodes, such as business objects 210e-f and nodes 210a-d. The ESDL document defining the interaction with the sales order service and the corresponding business object sales order 205, may be published by storing the ESDL document at an accessible location. Before client system 110 makes a call to a service at service provider 180, client 110 may find the ESDL document by querying and retrieving the repository containing the ESDL document for the sales order service. For example, client 110 may query a repository for the name "sales order." The repository, such as a registry storing the ESDL document, may then provide the ESDL document or the location of the ESDL document defining the format and procedure for interacting with the sales order service at service provider 180. Client system 110 then retrieves the ESDL document, and calls the service at service provider 180. The call may include a SOAP request message formatted consistent with the definitions provided by the ESDL document. Client 110 then sends the SOAP request to service provider 180. The service provider 180 instantiates sales order business object based on the received message. The sales order business object then executes the request contained in the SOAP request message and (if necessary) responds with a result, which may also be formatted in ESDL as a SOAP response message. As such, ESDL allows the description of objects, such as business objects including the corresponding data and methods, at a service provider.

The following description provides examples of ESDL documents including tags and associated parameter values, which can be used in a message to allow a client to call a service having one or more business objects.

Using ESDL, a business object model may be defined as follows:

<esi:businessObjectModel xmlns:esi="x" name="y" origLang="z" namespace="a" kind="b" category="c">, where "esi" is a tag indicating that ESDL extends WSDL, such as WSDL 1.1 or WSDL 2.0. The tag "xmlns:esi=" defines a value x as a location of a namespace for the ESDL document. The tag "name" defines a value y that represents the name of the business object model; "origLang" defines a value z that represents a language code associated with the business object model, such as two letter code for German (e.g., GE); "namespace" defines a value a used to uniquely identify elements or attributes in the ESDL document; "kind" defines a value b that represents the different kinds of business objects, such as business object or a dependent business object; and "category" defines a value c that represents the different categories of business objects, such as a business object, a projection, or a template.

Table 1 below provides an example of an ESDL document for a business object, such as the business object models of FIGS. 3A and 3B. A message calling the business object at a service provider may use one or more of the exemplary definitions depicted in lines 1-31 of Table 1.

TABLE 1

Example of an ESDL document defining a Business Object Model

| | |
|---|---|
| 1 | <wsdl:definitions xmlns:wsdl="http://schemas.xmlsoap.org/wsdl/" name="SalesOrder" targetNamespace="http://sap.com/xi/AP/CRM/Global"> |
| 2 | <wsdl:documentation> |
| 3 | Sales Order |
| 4 | </wsdl:documentation> |
| 5 | <wsdl:types> |
| 6 | ... |
| 7 | </wsdl:types> |
| 8 | <esi:businessObjectModel xmlns:esi="urn:sap.com:esi" name="SalesOrder" origLang="DE" namespace="http://sap.com/xi/AP/CRM/Global" kind="BusinessObject" category=" BusinessObject"> |
| 9 | <esi:annotation> |
| 10 | <esi:appinfo source="http://sap.com/xi/VersionID"> |
| 11 | 1ff7d6f0153f11daa17e000bcdc579f8 |
| 12 | </esi:appinfo> |
| 13 | </esi:annotation> |
| 14 | <esi:description> |
| 15 | Sales Order |
| 16 | </esi:description> |
| 17 | <esi:base name="CustomerTransactionDocument_Template" namespace="http://sap.com/xi/AP/CRM/Global" /> |
| 18 | <esi:namespaceDeclarations /> |
| 19 | <esi:properties> |
| 20 | ... |
| 21 | </esi:properties> |

TABLE 1-continued

Example of an ESDL document defining a Business Object Model

| | |
|---|---|
| 22 | </esi:businessObjectModel> |
| 23 | </wsdl:definitions> |

Referring to Table 1, lines 1-7 appear in a WSDL format, as indicated by the tag "wsdl." Line 8 depicts ESDL. Specifically, the tag "esi" may indicate a definition associated with ESDL (i.e., an extension to WSDL). The tag "xmlns:esi=" and corresponding value "urn:sap.com:esi" define urn:sap.com:esi as a location of a namespace for the ESDL document. The tag "name" defines SalesOrder as the name of the business object model; "origLang" defines DE as the language code associated with the business object model; "namespace" defines http://sap.com/xi/AP/CRM/Global as the location identifying the elements of the ESDL document; "kind" defines BusinessObject as the kind of business object; and "category" defines BusinessObject as the category of business object. Line 9 depicts an ESDL tag for "annotation" which defines information regarding the application(s) associated with the business object. For example, the version ID of the application is stored at a location defined by "http://sap.com/xi/VersionID"> (line 10). Line 11 represents an identifier to indicate the version.

Line 14 depicts an ESDL "description" which allows the definition of a description for the business object model. In the example of Table 1, the description is "Sales Order" (line 15). Line 17 depicts ESDL for defining a base name of "CustomerTransactionDocument_Template." A file defining the base name can be found at the namespace defined by http://sap.com/xi/AP/CRM/Global (line 17). Lines 19-21 allow property definitions of the business object model. Line 22 depicts the closing XML tag for the opening tag at line 8, while line 23 represents the closing XML tage for line 1.

Using ESDL, a business object node, such as node 210, may be defined as follows:

<esi:node xmlns:p3="f" name="g" namespace="h" data="i">, where "<esi:node" represents that the ESDL is an extension defining a business object node; "xmlns:p3=""f" defines a value f representing a location of a namespace for the EDSL document; name defines a value g that represents the name of the business object node; namespace defines a value h that represents the location of the file for uniquely identifying the tags of the ESDL documents; and "data" represents a data type, such as the declaration of an integer, character, or complex data type.

Table 2 below describes an example of an ESDL document for a business object node. A message calling a service provider may use one or more of the exemplary definitions depicted in lines 1-9 of Table 1. Referring to Table 2, line 1 defines ESDL for a business object node (see "<esi:node"). Moreover, xmlns:p3= defines "http://sap.com/xi/AP/CRM/Global" as the location of a namespace for the EDSL document for the business object node named "ItemScheduleLine."

Line 1 also depicts that the business object node may be defined to include the following field: "IsTransformation" for indicating whether a node performs any type of data transformation before being presented at a user interface. Furthermore, line 1 may include data="p3:CustomerTransactionDocumentItemScheduleLineElements"> which represents the name of the data file for the business object node ItemScheduleLine.

The business object node may also include a description, such as <esi:description> at line 2. Lines 3-7 depict semantic keys for allowing syntax to be defined. Line 8 depicts the tag "<esi:interface name=" having a value of ItemScheduleLine. The interface name defines the name of the interface, such as an API, that can be called to instantiate the business object node named ItemScheduleLine. Line 8 also depicts pattern="http://www.sap.com/interfacepatterns/wsdl/access" for defining the location of interface patterns 224. Line 9 shows the closing XML tag for line 1.

TABLE 2

Example of an ESDL document defining a Business Object Node

| | |
|---|---|
| 1 | <esi:node xmlns:p3="http://sap.com/xi/AP/CRM/Global" name="ItemScheduleLine" namespace=" " IsTransformation= "true"data= "p3:CustomerTransactionDocumentItemScheduleLineElements"> |
| 2 | <esi:description>ItemScheduleLine</esi:description> |
| 3 | <esi:semanticKeys> |
| 4 | <esi:key xPath="/UUID" /> |
| 5 | <esi:key xPath="/BuyerID" /> |
| 6 | <esi:key xPath="/ID" /> |
| 7 | </esi:semanticKeys> |
| 8 | <esi:interface name="ItemScheduleLine" namespace=" " pattern="http://www.sap.com/interfacepatterns/wsdl/access" /> |
| 9 | </esi:node> |

Table 3 below shows an ESDL document used to define associations, such as associations 215, between business objects and business object nodes. A message calling the business object at a service provider may use one or more of the exemplary definitions depicted in lines 1-12 of Table 3. Referring to Table 3, the field "<esi:association name=" defines the name of the association as "Material" (line 2), while namespace="xxx.com" represents the namespace for the association "Material." The field "<esi:description" defines an ESDL description, such as an association to a business object named "Material" (line 3). The tags "<esi: property name" at lines 4-7 define the names of properties and their corresponding values. For example, the association depicted in Table 3 includes a property named "cardinality" which can have a value of 0 or 1 (line 4). The property "association type" represents that the association is a cross business object association (line 5). The source field property indicates the source field of the source business object node, while the target field indicates the target field of the target business object node (line 6-7). For example, FIG. 3 depicts association 215 with product id as the source field and id as the target id. The tag "<esi:target>" identifies the target business object as "Material" (line 9). Referring again to FIG. 3, the target business object would be 210c since the association 215 links node 210b to 210c. Moreover, Table 3 indicates that the namespace for "Material" is defined at the following location: http://sap.com/xi/AP/FO/Product/Global. Line 10 defines the target node as a "Root," with the namespace defined by the value of the namespace tag. Lines 11 and 12 provide closing tags for lines 8 and 1 respectively.

TABLE 3

Example of an ESDL document defining Associations

| | |
|---|---|
| 1 | <esi:association name=" " namespace=" "> |
| 2 | <esi:association name="Material" namespace="xxx.com"> |
| 3 | <esi:description>Association to BO Material</esi:description> |
| 4 | <esi:property name="cardinality" value="0 . . . 1" /> |
| 5 | <esi:property name="associationType" value="cross" /> |
| 6 | <esi:property name="sourceField" value="/ProductUUID" /> |

TABLE 3-continued

Example of an ESDL document defining Associations

| | |
|---|---|
| 7 | <esi:property name="targetField" value="/UUID" /> |
| 8 | <esi:target> |
| 9 | <esi:targetBO name="Material" namespace="http://sap.com/xi/AP/FO/Product/Global" /> |
| 10 | <esi:targetNode name="Root" namespace=" " /> |
| 11 | </esi:target> |
| 12 | </esi:association> |

Table 4 below shows an example of an ESDL document used to define an operation, such as a query 225b. A message calling the business object at a service provider may use one or more of the exemplary definitions depicted in lines 1-4 of Table 4. Line 1 defines an interface, such as an API, named "ItemSelection." The query named ItemSelection has a corresponding interface pattern 224 at http://www.sap.com/interfacepatterns/wsdl/query. As described above, the interface pattern 224 defines the format of the operation including the input and/or output parameters. In the case of a query operation, the input parameter for the query is defined using "inparameter," with the "type" indicating a declaration of type, such a data, character, or complex data type declaration. The namespace for ItemSelection is defined by the value of the tag "namespace." Line 2 depicts the tag "typeAssignment id" for defining the input parameter for the query. Line 2 also defines the "type" of the input parameter at "p3:CustomerTransactionDocumentItemElements." The tag "<esi:description" enables a description for the query, which in this example has not been defined. Lastly, the tag "</esi:interface>" (line 4) is the closing tag for line 1.

TABLE 4

Example of an ESDL document defining a Query Operation

| | |
|---|---|
| 1 | <esi:interface name="ItemSelection" namespace=" " pattern="http://www.sap.com/interfacepatterns/wsdl/query"> |
| 2 | <esi:typeAssignment id="inparameter" type="p3:CustomerTransactionDocumentItemElements" /> |
| 3 | <esi:description /> |
| 4 | </esi:interface> |

Table 5 below shows an ESDL document used to define an action operation, which in this case is a "cancel" operation. A message calling the business object at a service provider may use one or more of the exemplary definitions depicted in lines 1-4 of Table 5. The "cancel" operation cancels a pending operation or request. For example, if a query were pending, cancel would terminate the query. Referring to Table 5, line 1 defines the interface name as "CANCEL," with its corresponding namespace defined at the location defined by the value of namespace="xxx.com." Next, the interface pattern 224 for the cancel operation is located at "http://www.sap.com/interfacepatterns/wsdl/action>." The "<esi:description" (line 2) enables a description for the cancel operation. The cancel operation may have a property, which is defined as a cardinality value of 0 (line 3). Lastly, the tag "</esi:interface>" (line 4) is the closing tag for line 1.

TABLE 5

Example of an ESDL document for an Action Operation

| | |
|---|---|
| 1 | <esi:interface name="CANCEL" namespace="xxx.com" pattern="http://www.sap.com/interfacepatterns/wsdl/action"> |
| 2 | <esi:description /> |

TABLE 5-continued

Example of an ESDL document for an Action Operation

| | |
|---|---|
| 3 | <esi:property name="cardinality" value="0" /> |
| 4 | </esi:interface> |

Table 6 below depicts an example of an ESDL document for a status variable, such as a status variable 292. A message calling the business object at a service provider may use one or more of the exemplary definitions depicted in lines 1-4 of Table 6. Line 1 depicts that the ESDL defines a "status variable" name of myStatusVariable. The namespace for myStatusVariable is defined by the value xxx.com of the tag namespace. Next, ESDL defines the properties "referenceField" and "hasStateGuard" (lines 2 and 3). The property "hasStateGuard" represents whether a status variable has a "state guard" (i.e., a protected state) or not, while the property "referenceField" represents the field where that status information may be retrieved from.

TABLE 6

Example of an ESDL document for a Status Variable

| | |
|---|---|
| 1 | <esi:statusVariable name="myStatusVariable" namespace="xxx.com"> |
| 2 | <esi:property name="referenceField" value="/status" /> |
| 3 | <esi:property name="hasStateGuard" value="true" /> |
| 4 | </esi:statusVariable> |

Table 7 below depicts an example of an ESDL document used to define properties associated with, for example, a business object. A message calling the business object at a service provider may use one or more of the exemplary definitions depicted in lines 1-12 of Table 7. ESDL may have properties with different names. For example, properties can have names corresponding to different properties, such as "ENABLED," "CREATE_ENABLED," "UPDATE_ENABLED", "DELETE_ENABLED," and "TRANSIENT_KEY" (line 1). For example, a property of create enable allows the creation of business object nodes. The update enabled property allows data associated with a business object to be updated. The "owner type" (line 2) indicates what the property is associated with. For example, a property may be associated with a business object node ("BO_Node") or an association ("BO_Association") between business object nodes. The property may also have associated parameters, such as whether it is a boolean property or whether it is a final value (line 5). For the property, the name of the business object ("<esi:ownerBO name="" namespace="" />") and business object node (" <esi:ownerBON name="" namespace="" />") can also be defined (lines 7-8). Lines 9, 10, and 12 are the closing tags for lines 6, 4, and 1 respectively.

TABLE 7

Example of an ESDL file for Properties

| | |
|---|---|
| 1 | <esi:property name = "ENABLED", "CREATE_ENABLED", "UPDATE_ENABLED", "DELETE_ENABLED" and "TRANSIENT_KEY"> |
| 2 | Type: <esi:owner type="BO_Node", "BO_Association" |
| 3 | |
| 4 | <esi:properties> |
| 5 | <esi:property name=" " value="boolean" isFinal="boolean"> |
| 6 | <esi:owner type=" "> |
| 7 | <esi:ownerBO name=" " namespace=" " /> |

TABLE 7-continued

Example of an ESDL file for Properties

| | |
|---|---|
| 8 | <esi:ownerBON name=" " namespace=" " /> |
| 9 | </esi:owner> |
| 10 | </esi:property> |
| 11 | . . . |
| 12 | </esi:properties> |

Table 8 below depicts an example of an ESDL document for a status schema. A message calling the business object at a service provider may use one or more of the exemplary definitions depicted in lines 1-7 of Table 8. Line 1 depicts that the ESDL definition for "statusSchema" is named "salesOrderStatusSchema" with a namespace defined at the location defined by it value (e.g., yyy.com). Line 2-4 allows a description to be included with the status schema definition, while lines 5-6 define properties for the status schema. In the example of Table 8, the properties define the version of the application (line 5) and the coding used for messages (line 6). Line 7 depicts the closing tag corresponding to line 1.

TABLE 8

Example of an ESDL file for Status Schema

| | |
|---|---|
| 1 | <esi:statusSchema name="salesOrderStatusSchema" namespace="yyy.com"> |
| 2 | <esi:description> |
| 3 | Schema for standard sales order items |
| 4 | </esi:description> |
| 5 | <esi:property name="version" value="wC528DsaEdqvbtF7ChJiBw" /> |
| 6 | <esi:property name="runSchemaBlob" value="<?xml version="1.0" encoding="UTF-8"?> . . . " /> |
| 7 | </esi:statusSchema> |

Table 9 below depicts an example of an ESDL document for a derivator. A message calling the business object at a service provider may use one or more of the exemplary definitions depicted in lines 1-5 of Table 9. Line 1 depicts that the ESDL definition for "derivator" is named "AccumulateShipmentStatus" with a namespace defined at the location defined by the parameters of namespace (e.g., xyz.com). Line 1 also defines a type of derivator as "Aggregation." Aggregation represents an aggregation of a status variables, such as status variable 292. For example, a status variable may indicate that a sales order has been "received," while another status variable may indicate that a product on the sales order is "available." In this example, aggregation may define that a product can be shipped to a customer when both sales "received" and "available" are true. Line 2-4 allows a description to be included with the derivator definition (e.g., Aggregates shipment status from items), while lines 5 depicts the closing tag corresponding to line 1.

TABLE 9

Example of an ESDL file for a Derivator

| | |
|---|---|
| 1 | <esi:derivator name="AccumulateShipmentStatus" namespace="xyz.com" type="Aggregation"> |
| 2 | <esi:description> |
| 3 | Aggregates shipment status from items |
| 4 | </esi:description> |
| 5 | </esi:derivator> |

Although Tables 1-9 are described separately above, a message formatted based on ESDL may include any number of definitions from one or more of Tables 1-9. Moreover, because Table 1-9 allow the complete definition of a business object including its business object nodes, a message calling a service having the business object may make one call to the service provider. The service provider may use the ESDL formatted message to completely instantiate the business object. For example, if a business object node provides a valued to another business object node, the relationship between business object may be defined as an association, which may be defined using ESDL.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A method for making a call to a service having a business object, the method comprising:
   formatting a message based on a language, the language defining an interaction with the business object at the service, the language further defining an association between the business object and at least one business object node, the association, defined by the message formatted based on the language, enabling, at the service, an instantiation of the business object including the at least one business object node, the language further defining a quantity of the at least one business object node, one or more names for the at least one business object node, a structure of the at least one business object node, and one or more default queries of the at least one business object node; and
   calling the service using the formatted message, such that the formatted message instantiates the business object and the at least one business object node.

2. The method of claim 1, wherein formatting comprises:
   formatting the message based on the language, wherein the language further defines a status variable representing whether a field of the at least one business object node is protected and defines a property of the at least one business object node.

3. The method of claim 1, wherein formatting comprises:
   formatting the message in accordance with a document describing the service using an Enterprises Services Description Language (ESDL).

4. The method of claim 3, wherein formatting comprises:
   including in the document a tag labeled esi to indicate the ESDL.

5. The method of claim 3, wherein formatting comprises:
   formatting the message to describe, using the ESDL, the following aspects of the service, the business object, or the business object node: a property, a status, a derivator, an interface format, a query, an action, an association, an interface pattern, an operation, and a template.

6. The method of claim 3, comprising:
   making the document available on a network.

7. The method of claim 1, wherein calling comprises:
   calling the service using a Simple Object Access Protocol (SOAP) message.

8. The method of claim 1, comprising:
   instantiating the business object including variables and functions related to a business task.

9. A computer-readable medium containing instructions executed by a processor to perform a method for making a call to a service having a business object, the method comprising:
   formatting a message based on a language, the language defining an interaction with the business object at the service, the language further defining an association between the business object and at least one business object node, the association, defined by the message formatted based on the language, enabling, at the service, an instantiation of the business object including the at least one business object node, the language further defining a quantity of the at least one business object node, one or more names for the at least one business object node, a structure of the at least one business object node, and one or more default queries of the at least one business object node; and
   calling the service using the formatted message, such that the formatted message instantiates the business object and the at least one business object node.

10. The computer-readable medium of claim 9, wherein formatting comprises:
    formatting the message based on the language, wherein the language further defines a status variable representing whether a field of the at least one business object node is protected and defines a property of the at least one business object node.

11. The computer-readable medium of claim 9, wherein formatting comprises:
    formatting the message in accordance with a document describing the service using an Enterprises Services Description Language (ESDL).

12. The computer-readable medium of claim 11, wherein formatting comprises:
    including in the document a tag labeled esi to indicate the ESDL.

13. The computer-readable medium of claim 11, wherein formatting comprises:

formatting the message to describe, using the ESDL, the following aspects of the service, the business object, or the business object node: a property, a status, a derivator, an interface format, a query, an action, an association, an interface pattern, an operation, and a template.

14. A system for making a call to a service having a business object, the system comprising:

a processor; and a memory, wherein the processor and the memory are configured to perform a method comprising:

formatting a message based on a language, the language defining an interaction with the business object at the service, the language further defining an association between the business object and at least one business object node, the association, defined by the message formatted based on the language, enabling, at the service, an instantiation of the business object including the at least one business object node, the language further defining a quantity of the at least one business object node, one or more names for the at least one business object node, a structure of the at least one business object node, and one or more default queries of the at least one business object node; and calling the service using the formatted message, such that the formatted message instantiates the business object and the at least one business object node.

15. The system of claim 14, wherein formatting comprises: formatting the message based on the language, wherein the language further defines a status variable representing whether a field of the at least one business object node is protected and defines a property of the at least one business object node.

16. The system of claim 14, wherein formatting comprises:

formatting the message in accordance with a document describing the service using an Enterprises Services Description Language (ESDL).

17. The system of claim 16, wherein formatting comprises:

including in the document a tag labeled esi to indicate the ESDL.

18. The system of claim 16, wherein formatting comprises:

formatting the message to describe, using the ESDL, the following aspects of the service, the business object, or the business object node: a property, a status, a derivator, an interface format, a query, an action, an association, an interface pattern, an operation, and a template.

19. The system of claim 16, wherein the method further comprises:

making the document available on a network.

* * * * *